United States Patent Office 3,772,343
Patented Nov. 13, 1973

3,772,343
ALKYL 5-(HYDROXYCYCLOHEXYL)INDAN-1-CAR-
BOXYLATE AND DERIVATIVES THEREOF
Shunsaku Noguchi, Osaka, Kiyohisa Kawai, Kyoto, and
Yoshio Kanai, and Shigeharu Tanayama, Osaka, Japan,
assignors to Takeda Chemical Industries, Ltd., Osaka,
Japan
No Drawing. Filed Dec. 21, 1971, Ser. No. 210,336
Claims priority, application Japan, Dec. 29, 1970,
46/128,941; May 6, 1971, 46/29,975
Int. Cl. C07c 69/76
U.S. Cl. 260—473 F        12 Claims

ABSTRACT OF THE DISCLOSURE

Novel compounds of the formula

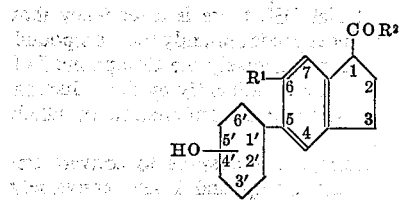

(wherein $R^1$ is hydrogen or a halogen and $R^2$ is hydroxy, alkoxy, amino group or OMe in which Me means a metal), which are useful for anti-inflammatories, analgesics, anti-pyretics, anti-rheumatics, etc. and intermediates for production of the above objective compounds, which are represented by the formula

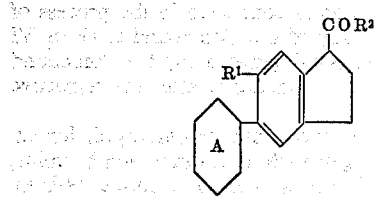

(wherein the cyclohexane ring A has a free or protected oxo group and $R^1$ and $R^2$ have the meaning defined above).

---

This invention relates to novel indan derivatives of the formula

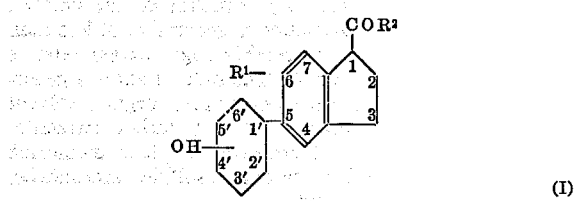

(wherein $R^1$ is hydrogen or halogen and $R^2$ is hydroxy, alkoxy, amino or OMe in which Me is a metal), together with a process for preparation thereof. The compounds of the present invention are useful as anti-inflammatories, analgesics, anti-pyretics and anti-rheumatics.

The present inventors have made extensive studies on the metabolism of 6-chloro - 5 - cyclohexyl-indan-1-carboxylic acid of the formula

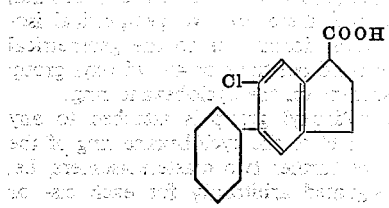

which was known to be useful for anti-inflammatories, and found unexpectedly that 6 - chloro - 5 - (hydroxycyclohexyl) indan-1-carboxylic acid of the formula

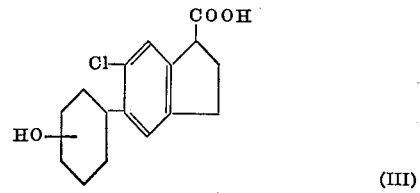

is produced by perfusing the Compound II with isolated liver tissue of mammals. They also found that the Compound III is unexpectedly far superior to the Compound II as an anti-inflammatory, analgesic, anti-pyretic and anti-rheumatic, due to much less toxicity and side effects of the Compound III.

Subsequently, the present inventors succeeded in synthesizing the Compound III and derivatives thereof and confirmed the pharmacological activities of those compounds as anti-inflammatories, analgesics, anti-pyretics and anti-rheumatics.

The principal object of this invention is to provide novel Compounds I and a process for production of these compounds.

Another object of the present invention is to provide a process for production of intermediates for synthesizing the Compounds I.

Further objects will become clear from the description set forth hereinafter.

The principal object of the present invention is realized by reducing a compound of the formula

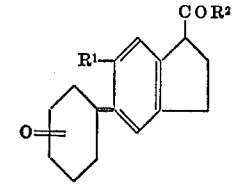

(wherein $R^1$ and $R^2$ have the same meanings defined above and O= represents an oxo group attached to the cyclohexane ring), and optionally halogenating the resulting compound when $R^1$ is hydrogen.

Another object of the present invention, producing the starting Compound IV, is realized by reducing a compound of the formula

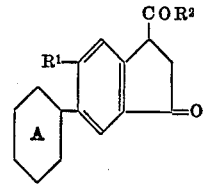

(wherein the cyclohexane ring A has oxo group which may be protected and the other symbols have the meaning defined above), followed by removal of the protecting group when a protected oxo group is present on the cyclohexane ring A, and optionally halogenating the resulting compound wherein $R^1$ is hydrogen, before or after the removal of the protecting group.

Referring to the afore-mentioned Formulas I, IV and V, halogen represented by $R^1$ may be for example chlorine and bromine. Alkoxyl group represented by $R^2$ may preferably be lower ones such as methoxy, ethoxy and propoxy group. Metal represented by Me may be for example sodium, potassium, ½ calcium and ⅓ aluminium. The protected oxo group which may be attached to the cyclohexane ring A may be for example lower alkylene ketal (e.g. ethylene ketal and propylene ketal), lower dialkyl ketal (e.g. dimethyl ketal), enol lower acylate (e.g. enol acetate), enol lower alkyl ether (e.g. enol methyl ether), oxime and semicarbazone.

The present invention will be explained hereinafter in more detail referring to the Chart 1 attached hereto.

According to the Step 1, the carbonyl group of the 3-position of the Compound V is reduced into a methylene group. The reduction can be conducted by any conventional reduction techniques, by which a carbonyl group can be reduced into a methylene group.

Those reduction means may be for example Clemmensen's Reduction employing, for instance, amalgamated zinc and hydrochloric acid, Wolff-Kishner's Reduction wherein a semicarbazone or a hydrazone of the Compound V is treated with a base, and a catalytic reduction in the presence of, for example, palladium carbon. Particular reaction conditions for the reduction can suitably be determined according to those in the conventional reduction means.

It is generally recommendable to protect a free oxo group, which presents on the cyclohexane ring A of the Compound V, prior to the reduction in order to prevent the oxo group on the cyclohexane ring A from being excessively reduced into a methylene group. The protection of the free oxo group on the cyclohexane ring A can be attained by converting the free oxo group, by per se conventional means, into a form of a ketal, enol ester, enol ether, oxime or semicarbazone. However, in a case of catalytic reduction, it may be possible to reduce the carbonyl group of the 3-position and successively the oxo group of the cyclohexane ring into a methylene and hydroxy group, respectively.

In a process according to the Step 1, the carbonyl group at the 3-position of the Compound V is reduced into a methylene group, whereby a compound of the formula

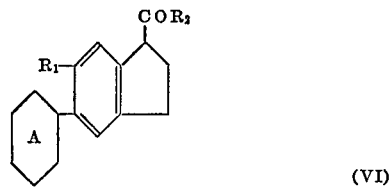

(VI)

(wherein all the symbols have the meaning defined above) is produced.

In the Step 2 according to the present invention, the protected oxo group which presents on the cyclohexane ring A, is converted to a free oxo group. The conversion of the protected oxo group into a free oxo group can be easily attained by per se conventional means, for instance, by treating the Compound VI having a protected oxo group on the cyclohexane ring A with an acid such as hydrochloric acid, sulfuric acid or acetic acid or a base such as potassium bicarbonate, potassium carbonate and sodium hydroxide.

In this manner, a protected oxo group which presents on the cyclohexane ring A is converted into a free oxo group.

In the Step 3 according to the present invention, the oxo group of the Compound IV is reduced into a hydroxyl group. The reduction can be attained by per se conventional reduction means, by which an oxo group can be reduced into a hydroxyl group. Those conventional reduction means may be for example those employing metal hydride (e.g. sodium borohydride, potassium borohydride, lithium aluminum hydride, aluminum hydride or sodium propoxyborohydride) or a combination of alkali metal (e.g. sodium) with an alcohol (e.g. methanol, ethanol and butanol), or a catalytic reduction employing a catalyst such as nickel, platinum or rhodium.

Particular reaction conditions for the present reduction can suitably be determined with reference to those in the conventional ones mainly depending upon kind of the desired Compound I.

In the present Step 3, the oxo group of the cyclohexane ring of the Compound IV can be reduced into two types of hydroxyl group, i.e. axial or equatorial OH, which corresponds to either cis- or trans- form of the Compound I depending upon the geometrical relation between the bond positions of the hydroxyl group and the equatorial indanyl substituent at the 1'-position. Relation between axial or equatorial OH and isomeric cis- or trans- form of the Compound I is listed below:

| Position of OH | Type of OH | Cis- or trans- isomer of the Compound I |
|---|---|---|
| 3' or 5' | Axial OH | Trans. |
|  | Equatorial OH | Cis. |
| 2', 4' or 6' | Axial OH | Cis. |
|  | Equatorial OH | Trans. |

While according to the Step 3, there is generally produced a mixture of the Compound I having axial OH and that having equatorial OH, there is a tendency that catalytic reduction produces predominantly the Compound I having the axial OH and conversely the Compound I of the equatorial OH is produced eminently by the reduction employing a metal hydride or a combination of alkali metal with an alcohol.

In view of the tendency, it is possible to convert cis- into trans- isomer of the Compound I and conversely trans- into cis- isomer of the Compound I by, for instance, once oxidizing either form of hydroxyl group of the Compound I into oxo group with an oxidizing agent such as chromium trioxide, aluminum isopropoxide or dimethylsulfoxide dicyclohexylcarbodimide and again applying suitable reduction technique which would produce predominantly the desired form of hydroxyl group.

When the halogenation is conducted in the process of the present invention, any of the Compound I, IV or VI wherein $R^1$ is hydrogen is halogenated into the Compound I, IV or VI wherein $R^1$ is a halogen, after the respective Step 3, 2 or 1.

For the halogenation there may be employed, for example, molecular halogen such as chlorine and bromine, and a halo-compound such as sulfuryl chloride, N-halosuccinimide (e.g. N-chlorosuccinimide and N-bromosuccinimide) and N-haloacetamide (e.g. N-bromoacetamide).

While the halogenation is generally carried out without using any catalyst, it may be accelerated by a catalyst such as metal halide (e.g. aluminum chloride, ferric chloride, zinc chloride, antimony trichloride, antimony pentachloride and stannic chloride). Amount of the catalyst employable for the halogenation is generally not less than chemical equivalent and preferably slight excess relative to the Compound I, IV or VI. The halogenation is generally conducted in the presence of an inert organic solvent such as halogenated hydrocarbon (e.g. carbon tetrachloride, tetrachloroethane, chloroform, ethylene dichloride and methylene chloride), carbon disulfide, acetonitrile, nitrobenzene and acetic acid.

Since side reactions may be induced along elevation of the reaction temperature, it is generally preferable to conduct the halogenation at room temperature or under cooling.

In this manner, though halogenation may optionally be conducted after the Step 1, 2 or 3, it may be most preferably taken place at the final step after the Step 3.

Referring to the Compound I of the present invention, in a case where hydroxyl group is attached to 4'-position of the cyclohexane ring, there are two geometrical isomers, i.e. cis- and trans- forms due to the geometrical relation between the bond positions of 4'-hydroxyl group and 1'-indanyl substituent on the cyclohexane ring.

In a case where hydroxyl group is attached to any position of 2', 3', 5' or 6' of the cyclohexane ring of the compound I, there are further two diastereoisomers, i.e. α- and β-forms designated arbitrarily for each cis- or trans-isomer. Thus, in this case, there are four isomers for each position as specified below depending upon the spatial relationship.

(1) cis-α-form
(2) cis-β-form
(3) trans-α-form
(4) trans-β-form

Referring to the Compounds IV, V and VI, in a case where the free or protected oxo group is attached to any position of 2', 3', 5' or 6', there exist two diastereoisomers, i.e. α- and β-forms, due to the spatial relationship.

The Compound I which is produced by the process of the present invention can be isolated in desired purity from the resulting mixture by per se conventional separation and purification means such as distillation, extraction, recrystallization, chromatography, etc. For instance, in a case where the Compound I is a mixture of cis- and trans-isomers, it can be separated into respective cis- and trans-isomers, each of which can be further separated into respective diastereoisomers of α- and β-forms by per se conventional means.

In regard to the Compounds I of the present invention, the following conversions can be conducted among themselves by per se conventional means.

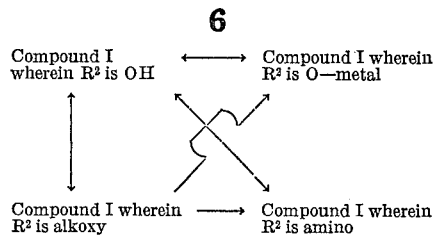

The present Compound I wherein $R^2$ is OH can optionally be converted into an organic or inorganic amine salt with ammonia, ethanolamine, dimethylamine, diethylamine, etc.

The Compounds I of the present invention show anti-inflammatory, analgesic, anti-pyretic and anti-rheumatic action with low toxicity as well as reduced undesirable side effect. Thus, the present compounds are useful for treatment of inflammatory, pain, pyretic and rheumatism. The present compounds can be administered orally or parenterally in per se conventional form such as powder, granule, tablets, suspension, solution, injection or suppository. While dosage of the present compound may vary with symptom and severity of the disease and the kinds of the compounds, etc., it is generally and suitably selected from the range of from about 5 mg. to about 500 mg. per day for adult human.

The Compound V employable in the process of the present invention can be prepared by or after the following route:

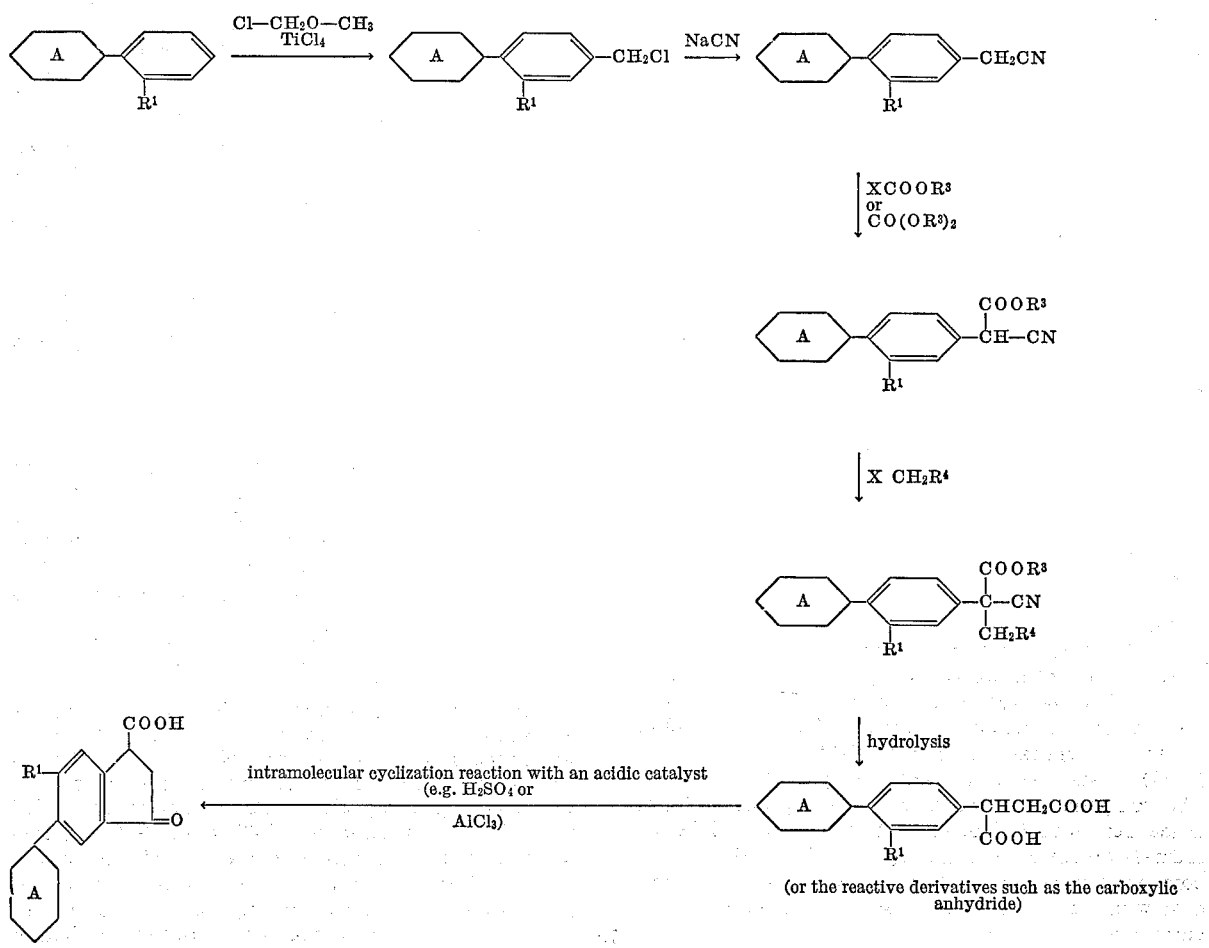

In the foregoing formulas, X is halogen (e.g. chlorine or bromine), $R^3$ is lower alkyl (e.g. methyl or ethyl), $R^4$ is alkoxycarbonyl (e.g. methoxycarbonyl or ethoxycarbonyl) or nitrile and the other symbols have the meaning defined before.

EXAMPLE OF PREPARATION OF THE PRESENT COMPOUND BY PERFUSION OF MAMMALIAN LIVER

Male rats weighing 250 g. are anesthetized with sodium pentobarbital (50 mg./kg., i.p.). After laparotomy, the liver is freed as far as possible from its ligaments. The portal vein is cleared of surrounding fat and cannulated with a polyethylene tubing attached to an intravenous drip bottle containing physiological saline. The liver is perfused at a steady rate with saline. Immediately, the thorax is opened and the vena cava incised to allow free flow of the perfusate. Finally, the remaining attachments of the liver to the carcass are severed and the perfusing liver transferred into the perfusion apparatus. The polyethylene cannula entering the portal vein is then connected to the main blood supply inside the chamber. The perfusion apparatus is equipped with an oxygenator, a thermostatic chamber and a peristatic pump. The perfusion chamber is maintained at a constant temperature (37° C.) by warm air circulation.

Perfusate employed in the present experiment has the following composition per 4 livers:

rat blood: 150 ml.
Krebs-Ringer bicarbonate buffer: 750 ml.
6-chloro-5-cyclohexylindan-1-carboxylic acid: 100 mg.
glucose: 0.1% (final concentration)
gelatin: 2 mg./ml. (final concentration)
heparin: 1000 units (final concentration)

After 6 hours of perfusion, the perfusate is collected. Acetone is added to the perfusate up to 80% by volume. The resulting precipitates are removed by filtration and the filtrate is concentrated under reduced pressure to about 100 ml. To the concentrate is added 50 g. of silica gel and the mixture is concentrated to dryness. To the residue is added benzene and the solvent is evaporated under azeotropic conditions to remove water in the residue. The silica gel residue is packed in a column and the column is washed with 400 ml. of benzene and with 180 ml. of chloroform and eluted with 2 l. of a mixture of benzene-acetone-acetic acid (10:10:1 by volume). The eluate is concentrated under reduced pressure to dryness. The residue is dissolved in a small amount of ethanol and spotted in a line on each of 4 plates (20 x 20 cm., silica gel $GF_{254}$) for thin layer chromatography. The spots are developed four times with a mixture of benzene, acetone and acetic acid (32:1:0.5 by volume).

Products are detected with ultra violet absorption and the parts corresponding to $R_f$ value of 0.54, 0.50 and 0.35 (relative values; 6-chloro-5-cyclohexylindan-1-carboxylic acid: 1.0) are scraped respectively. Each part is extracted 3 times each with 30 ml. of acetone.

All of the three compounds show the parent peak at m./e. 294 in mass spectrum. Infrared absorption spectrum of each of the compounds corresponding to the $R_f$ values of 0.54, 0.50 and 0.35 are shown in the FIGS. 1, 2 and 3 respectively. The compound corresponding to the $R_f$ value of 0.54 is identical with 6-chloro-5-(4'-cis-hydroxycyclohexyl) indan-1-carboxylic acid melting at 204 to 206° C. The compound corresponding to the $R_f$ value of 0.50 is identical with 6-chloro-5-(4'-trans-hydroxycyclohexyl) indan-1-carboxylic acid melting at 187 to 189° C. The compound corresponding to the $R_f$ value of 0.35 is identical with 6-chloro-5-(3'-cis-hydroxycyclohexyl) indan-1-carboxylic acid melting at 174 to 176° C.

PREPARATION OF THE STARTING MATERIALS

Reference 1

In 450 ml. of ethylene chloride is dissolved 81.8 g. of titanium tetrachloride. While stirring the solution under cooling at 2 to 5° C., a solution of 30.0 g. of 4-phenylcyclohexanone in 150 ml. of ethylene chloride is added dropwisely. The mixture is stirred for further 20 minutes after the addition. A solution of 16.6 g. of chloromethylmethyl ether in 75 ml. of ethylene chloride is dropwisely added at 2 to 5° C. The mixture is stirred for further 2 hours at the same temperature and then additional 15 ml. of chloromethylmethyl ether is added to the mixture, followed by stirring for further 1 hour. To the mixture is added dropwisely 750 ml. of 1 N-hydrochloric acid, whereby the titanium tetrachloride is decomposed. The mixture is extracted with chloroform and the chloroform layer is washed with an aqueous solution of sodium chloride, an aqueous solution of sodium bicarbonate and an aqueous solution of sodium chloride in this order and dried over anhydrous sodium sulfate. After evaporating the solvent under reduced pressure, the residue is purified by columnchromatography on silica gel with chloroform, whereupon 10.4 g. of crude 4-(4'-oxocyclohexyl) benzyl chloride is yielded as crystals.

The crude product is recrystallized from petroleum ether to yield crystals melting at 77 to 78° C.

Elementary analysis.—Calculated for $C_{13}H_{15}OCl$ (percent): C, 70.10; H, 6.79; Cl, 15.92. Found (percent): C, 70.15; H, 7.06; Cl, 15.52.

A mixture of 25.75 g. of 4-(4'-oxocyclohexyl) benzyl chloride, 7.3 g. of sodium cyanide, 2.76 g. of sodium iodide and 276 ml. of acetone is refluxed with stirring for 14 hours. After cooling, the acetone is evaporated under reduced pressure and water is added to the mixture. The mixture is acidified with hydrochloric acid and extracted with chloroform. The chloroform layer is washed with an aqueous solution of sodium chloride, dried over anhydrous sodium sulfate and distilled under reduced pressure to evaporate the solvent. The residue is purified by columnchromatography on silica gel with chloroform, whereby 10.97 g. of crude 4-(4'-oxocyclohexyl) phenylacetonitrile is obtained as crystals. The crude product is recrystallized from diethyl ether to yield crystals melting at 84 to 86° C.

Elementary analysis.—Calculated for $C_{14}H_{15}ON$ (percent): C, 78.84; H, 7.09; N, 6.57. Found (percent): C, 78.62; H, 6.86; N, 6.48.

A mixture of 10.97 g. of 4-(4'-oxocyclohexyl) phenylacetonitrile, 3.90 g. of ethylene glycol, 137 mg. of p-toluene-sulfonic acid and 69 ml. of toluene is refluxed for 4 hours, while removing water produced during the reaction by water-separator. After cooling the mixture, benzene is added thereto. The mixture is washed with an aqueous solution of sodium bicarbonate and an aqueous solution of sodium chloride in this order and dried over anhydrous sodium sulfate. After evaporating the solvent under reduced pressure, the residue is cooled, whereby 12.52 g. of crude 4-(4'-ethylenedioxycyclohexyl) phenylacetonitride is yielded as crystals. The crude product is recrystallized from cyclohexane to yield crystals melting at 84 to 86°.

Elementary analysis.—Calculated for $C_{16}H_{19}O_2N$ (percent): C, 74.68; H, 7.44; N, 5.44. Found (percent): C, 74.81; H, 7.47; N, 5.44.

Sodium ethoxide is prepared by adding 2.11 g. of metallic sodium to 99 ml. of anhydrous ethanol. After evaporating the most part of the ethanol under reduced pressure, nitrogen gas is introduced into the system so as to restore atmospheric pressure. To the system are added with stirring a solution of 22.48 g. of 4-(4'-ethylenedioxycyclohexyl) phenylacetonitrile in 165 ml. of anhydrous toluene and then 45.8 ml. of diethyl carbonate. The mixture is heated with stirring and ethanol produced along the progress of the reaction is distilled off. During the distillation, anhydrous toluene is dropwisely added to the reaction mixture to maintain the total volume. The distillation is continued for further 1 hour after the distillation temperature becomes the boiling point of toluene. After cooling, 15.4 g. of ethyl bromoacetate is added to the mixture and the mixture is refluxed for 1 hour with stirring. After cooling, benzene is added to the mixture. The mixture is washed with an aqueous solution of sodium chloride and dried over anhydrous sodium sulfate. After evaporating the solvent, the residue is distilled under reduced pressure, whereby 3.6 g. of diethyl α-[4-(4'-ethylenedioxycyclohexyl)phenyl]-α-cyanosuccinate is obtained as oil boiling at 220 to 225° C. (0.1 mm. Hg).

Elementary analysis.—Calculated for $C_{23}H_{29}O_6N$ (percent): C, 66.49; H, 7.04; N, 3.37. Found (percent): C, 66.63; H, 7.20; N, 3.07.

A mixture of 33.6 g. of diethyl α-[4-(4'-ethylenedioxycyclohexyl)phenyl]-α-cyanosuccinate, 40 g. of potassium hydroxide and 350 ml. of ethylene glycol is refluxed for 3.5 hours under nitrogen atomsphere. After cooling, water is added to the mixture and the mixture is washed with ethyl ether. The alkaline layer is acidified with hydrochloric acid under cooling and extracted with ethyl acetate. The ethyl acetate layer is washed with an aqueous solution of sodium chloride and dried over anhydrous sodium sulfate. After decolorizing the ethyl acetate solution with activated charcoal, the solvent is evaporated under reduced pressure, whereby 79.7 g. of 4-(4'-ethylenedioxycyclohexyl) phenylsuccinic acid is yielded as crystals. The product is recrystallized from ethyl acetate to yield crystals melting at 182 to 183.5° C.

Elementary analysis.—Calculated for $C_{18}H_{22}O_6$ (percent): C, 64.65; H, 6.63. Found (percent): C, 64.93; H, 6.84.

A mixture of 185 ml. of ethanol, 185 ml. of water, 18.5 ml. of acetic acid and 18.5 g. of 4-(4'-ethylenedioxycyclohexyl) phenylsuccinic acid is refluxed for 4 hours. After cooling, the solvent is evaporated under reduced pressure. The residue is dissolved in ethyl acetate. The solution is washed with an aqueous solution of sodium chloride, dried over anhydrous sodium sulfate and decolorized with activated charcoal. After evaporating the solvent under reduced pressure, a small volume of ethyl ether is added to the residue. The mixture is left standing to yield 2.35 g. of 4-(4'-oxocyclohexyl) phenylsuccinic acid monohydrate as crystals. The product is recrystallized from ethyl acetate to yield crystals melting at 140 to 143° C.

Treatment of the mother liquor yields further 17.1 g. of 4-(4'-oxocyclohexyl) phenylsuccinic acid as oil, which can be employed per se without further purification in the subsequent reaction.

Elementary analysis.—Calculated for $C_{16}H_{18}O_5 \cdot H_2O$ (percent): C, 62.32; H, 6.54. Found (percent): C, 62.22; H, 6.43.

A mixture of 17.6 g. of 4-(4'-oxocyclohexyl) phenylsuccinic acid and 88 ml. of acetic anhydride is refluxed for 5 minutes. After cooling, the solvent is evaporated under reduced pressure and the residue is dissolved in a mixture of ethyl ether and benzene. The solution is left standing to yield 10.9 g. of 4-(4'-oxocyclohexyl) phenylsuccinic anhydride. The product is recrystallized from ethyl ether-benzene to yield crystals melting at 112–113.5° C.

Elementary analysis.—Calculated for $C_{16}H_{16}O_4$ (percent): C, 70.57; H, 5.92. Found (percent): C, 70.42; H, 5.93.

7.17 g. of powdered aluminum chloride is added to 84 ml. of methylene chloride. While stirring the mixture under cooling at about 2° C. to 5° C. with ice-water, a solution of 4.18 g. of 4-(4'-oxocyclohexyl) phenylsuccinic anhydride in 50 ml. of methylene chloride is dropwisely added to the mixture. After adding, the mixture is stirred at room temperature for 1.5 hours and then additional 14.3 g. of powdered aluminum chloride is added to the mixture. The stirring is continued at room temperature for further 1 hour. While cooling the mixture with ice-water, diluted hydrochloric acid is dropwisely added to the mixture. The mixture is extracted with chloroform and the organic layer is washed with an aqueous solution of sodium chloride and dried over anhydrous sodium sulfate. The solvent is evaporated under reduced pressure. A mixture of ethyl acetate and n-hexane is added to the residue and the solution is left standing, whereupon 3.27 g. of 5-(4'-oxocyclohexyl)-3-oxoindan-1-carboxylic acid is precipitated as crystals. The product is recrystallized from ethyl acetate and n-hexane to give crystals melting at 153 to 155.5° C.

Elementary analysis.—Calculated for $C_{16}H_{16}O_4$ (percent): C, 70.57; H, 5.92. Found (percent): C, 70.42; H, 5.74.

Reference 2

Four-necked flask of 5 l. capacity is supplied with 1250 ml. of dichloromethane and 237.5 g. of titanium tetrachloride. A solution of 87.2 g. of 3-phenylcyclohexanone in 400 ml. of dichloromethane is added dropwise to the mixture with stirring under cooling with ice-water, followed by addition of a solution of 80.5 g. of chloromethyl methyl ether in 200 ml. of dichloromethane is about 1 hour. After the addition, the mixture is stirred for 1 hour under cooling with ice. The same amount of a solution of chloromethyl methyl ether in dichloromethane is added thereto and the mixture is stirred for 2 hours, followed by addition of a cooled mixture of 900 ml. of concentrated hydrochloric acid and 2.4 l. of water. The mixture is well shaken in a separatory funnel and the lower layer is taken, washed with a solution of sodium chloride and dried over sodium sulfate. After evaporation of the dichloromethane, the residue is purified by column chromatography on silica gel with chloroform. The fraction containing the object compound is concentrated and the residue is distilled under reduced pressure, whereupon 43.7 g. of 4-(3'-oxocyclohexyl) benzyl chloride is obtained as colorless oil boiling at 141 to 159° C. (0.3 mm. Hg). Redistillation gives oil boiling at 154 to 156° C. (0.55 mm. Hg).

Elementary analysis.—Calculated for $C_{13}H_{15}OCl$ (percent): C, 70.09; H, 6.79; Cl, 15.92. Found (percent): C, 70.33; H, 6.70; Cl, 16.00.

A mixture of 8.9 g. of 4-(3'-oxocyclohexyl) benzyl chloride, 3.2 g. of ethylene glycol, 120 mg. of p-toluenesulfonic acid monohydrate and 80 ml. of toluene is refluxed for 6 hours, while removing water produced along the progress of the reaction out of the reaction system. After completion of the reaction, the mixture is washed with 5% aqueous solution of sodium bicarbonate and then with an aqueous solution of sodium chloride and dried over sodium sulfate. The toluene is evaporated and the resdiue is distilled under reduced pressure, whereupon 9.7 g. of 4-(3'-ethylenedioxycyclohexyl) benzyl chloride is obtained as colorless oil boiling at 138 to 143° C. (0.08 mm. Hg), which is, after being left standing, solidified into crystals melting at 42 to 44° C.

Elementary analysis.—Calculated for $C_{15}H_{19}O_2Cl$ (percent): C, 67.17; H, 7.18; Cl, 13.29. Found (percent): C, 67.37; H, 7.18; Cl. 13.31.

A mixture of 8 g. of 4-(3'-ethylenedioxycyclohexyl) benzyl chloride, 2.2 g. of sodium cyanide and 90 ml. of 70% ethanol is refluxed for 4 hours. After cooling, ethanol is evaporated under reduced pressure. Water is added to the residue and the mixture is extracted with ethyl ether. The organic layer is dried and the solvent is evaporated under reduced pressure. The residue is purified by column chromatography on silica gel with chloroform. The solvent is evaporated from the eluate, whereby 6.4 g. of 4-(3'-ethylenedioxycyclohexyl) phenylacetonitrile is obained as crystals melting at 80 to 82° C.

Elementary analysis.—Calculated for $C_{16}H_{19}NO_2$ (percent): C, 74.68; H, 7.44. Found (percent): C, 74.74; H, 7.63.

To 100 ml. of anhydrous ethanol is added gradually 2.3 g. of sodium metal. After the metal dissolves completely, most part of the ethanol is evaporated under reduced pressure. A solution of 25.7 g. of 4-(3'-ethylenedioxycyclohexyl) phenylacetonitrile in 150 ml. of dry toluene is added dropwise to the residue and subsequently 53 ml. of diethyl carbonate is added dropwise with stirring. Ethanol is evaporated under heating, while dry toluene is added dropwise thereto in the same volume of evaporating ethanol. After the evaporating temperature reaches 110° C., the heating is continued for further 1 hour. After cooling, 16.7 g. of ethyl bromoacetate is added and the mixture is refluxed for 1 hour. After cooling, the mixture is well shaken with a mixture of ethyl ether and an aqueous solution of sodium chloride. The upper layer is washed with an aqueous solution of sodium chloride, dried over sodium sulfate and concentrated to dryness. To the residue are added 46 g. of potassium hydroxide and 400 ml. of ethylene glycol and the mixture is refluxed under the nitrogen atmosphere for 5 hours. After cooling, the reaction mixture is dissolved in 1.2 l. of water. The solution is washed with ethyl ether and acidified with 75 ml. of concentrated hydrochloric acid under cooling. The precipitates are extracted with ethyl acetate, washed with an aqueous solution of sodium chloride and dried over sodium sulfate. The ethyl acetate is evaporated, followed by addition of 300 ml. of ethanol, 300 ml. of water and 30 ml. of acetic acid. The mixture is refluxed for 4 hours and distilled under reduced pressure to evaporate the solvent. The residue is dissolved in ethyl acetate, washed with an aqueous solution of sodium chloride and dried over sodium sulfate. The ethyl acetate is evaporated under reduced pressure, whereby 26.0 g. of 4-(3'-oxocyclohexyl) phenylsuccinic acid is obtained as oil. To the oil is added 100 ml. of ethyl ether, whereupon 6.0 g. of colorless crystals are precipitated. Recrystallization from water gives crystals melting at 164 to 168° C., which are identified to be the compound by elementary analysis, infrared spectrum, nuclear magnetic resonance spectrum.

Elementary analysis.—Calculated for $C_{16}H_{18}O_5$ (percent): C, 66.19; H, 6.25. Found (percent): C, 66.04; H, 6.30.

A mixture of 26 g. of oily 4-(3'-oxocyclohexyl) phenylsuccinic acid as obtained above and 200 ml. of acetic anhydride is refluxed for 15 minutes. After evaporation of excess of the acetic anhydride and acetic acid produced, 100 ml. of ethyl ether and 10 ml. of benzene are added to the residue. The mixture is well shaken to give 4-(3'-oxocyclohexyl) phenylsuccinic anhydrides as colorless powder. The powder is collected by filtration and dried to give 8.6 g. Recrystallization from ethyl ether gives crystals melting at 114 to 116° C.

Elementary analysis.—Calculated for $C_{16}H_{16}O_4$ (percent): C, 70.55; H, 6.06. Found (percent): C, 70.58; H, 5.92.

To 400 ml. of dichloromethane is added 97.3 g. of anhydrous aluminum chloride, followed by addition of a solution of 19.9 g. of 4-(3'-oxocyclohexyl) phenylsuccinic anhydride in 200 ml. of dichloromethane with stirring under cooling with ice-water.

After the addition, the mixture is stirred for 1.5 hours under cooling and for further 1 hour at room temperature, and then cooled. A cooled mixture of 400 ml. of concentrated hydrochloric acid and 800 ml. of water is added and the resulting mixture is shaken well in a separatory funnel and the lower layer is taken and washed with an aqueous solution of sodium chloride and extracted with a solution of 45 g. of sodium bicarbonate in 600 ml. of water. The aqueous extract is acidified with concentrated hydrochloric acid under cooling and the precipitates are extracted with ethyl acetate.

The organic layer is washed with an aqueous solution of sodium chloride and dried over sodium sulfate. After evaporation of the solvent, 40 ml. of ethyl acetate is added to the residue and the mixture is left standing, whereupon 9.4 g. of 3 - oxo - 5 - (3'-oxocyclohexyl) indan-1-carboxylic acid is obtained as colorless powder.

The powder obtained above is fractionally and repeatedly recrystallized from ethyl acetate and is separated into two diastereoisomers.

One of the diastereoisomers is recrystallized twice from ethyl acetate to give colorless crystals melting at 161 to 164° C. (Hereinafter this form of the diastereoisomer and its derivatives is named as "α-form".)

Elementary analysis.—Calculated for $C_{16}H_{16}O_4$ (percent): C, 70.57; H, 5.92. Found (percent): C, 70.82; H, 5.99.

The other diastereoisomer is recrystallized twice from acetone to give colorless crystals melting at 188 to 191° C. (Hereinafter this form of the diastereoisomer and its derivatives is named as "β-form".)

Elementary analysis.—Calculated for $C_{16}H_{16}O_4$ (percent): C, 70.57; H, 5.92. Found (percent): C, 70.79; H, 5.87.

EXAMPLES OF THE STEP 1

Example 1

4.51 g. of 5-(4'-oxocyclohexyl)-3-oxoindan-1-carboxylic acid is dissolved in 480 ml. of acetic acid and shaken with hydrogen in the presence of 1.25 g. of 5% palladium charcoal until 827 ml. of hydrogen is absorbed. The catalyst is removed by filtration and the solvent is evaporated under reduced pressure. A mixture of ethyl ether and n-hexane is added to the residue, whereby 3.69 g. of 5-(4'-oxocyclohexyl) indan-1-carboxylic acid is given as crystals. The product is recrystallized from carbon tetrachloride to give crystals melting at 126 to 128° C.

Elementary analysis.—Calculated for $C_{16}H_{18}O_3$ (percent): C, 74.39; H, 7.02. Found (percent): C, 74.15; H, 6.73.

Example 2

Catalytic reduction is applied to 2.3 g. of powdery 3-oxo-5-(3'-oxocyclohexyl) indan-1-carboxylic acid in acetic acid in the presence of 1.4 g. of 5% palladium carbon, till 440 ml. of hydrogen is absorbed. The mixture is filtered and the filtrate is concentrated under reduced pressure. n-Hexane is added to the residue and the precipitated powder is collected by filtration, whereby 2.0 g. of 5-(3'-oxocyclohexyl) indan-1-carboxylic acid is obtained.

Nuclear magnetic resonance spectrum of the compound in deutero chloroform ($\tau$):

—0.22 (singlet, 1H, H of COOH)
2.85 (quartet, 2H, aromatic protons of 6- and 7-position)
2,96 (singlet, 1H, aromatic H of 4-position)
6.01 (triplet, 1H, methine proton of 1-position)
6.6–8.6 (multiplet, 13H)

In a similar manner to the above, α- and β- forms of 3-oxo-5-(3'-oxocyclohexyl) indan-1-carboxylic acid give the corresponding α- and β- forms of 5-(3'-oxocyclohexyl) indan-1-carboxylic acid as colorless crystals, respectively.

Nuclear magnetic resonance spectra of both forms of the compound are identical with those described above.

α- form: Melting point 135 to 138° C.

Elementary analysis.—Calculated for $C_{16}H_{18}O_3$ (percent): C, 74.41; H, 7.02. Found (percent): 74.30; H, 7.23.

β- form: Melting point: 132 to 135° C.

Elementary analysis.—Calculated for $C_{16}H_{18}O_3$ (percent): C, 74.41; H, 7.02. Found (percent): C, 74.28; H, 7.15.

EXAMPLES OF THE STEP 2 AND STEP 3

Example 3

A solution of 7.1 g. of methyl 6-chloro-5-(4'-oxocyclohexyl) indan-1-carboxylate is added dropwisely and with stirring to a solution of 380 mg. of sodium borohydride in 30 ml. of ethanol under cooling with ice. After adding, the mixture is stirred at room temperature for 1.5 hours so as to complete the reduction. Acetic acid is added to the mixture, whereby excess of the sodium borohydride is decomposed. The solvent is evaporated under reduced pressure, followed by addition of water. The mixture is extracted with ethyl ether and the ether layer is washed with diluted hydrochloric acid and then with an aqueous solution of sodium chloride.

The solvent is evaporated and the residue is purified by column chromatography on silica gel with benzene-ethyl acetate (7:1), whereby 4.2 g. of methyl 6-chloro-5-(4'-transhydroxycyclohexyl) indan-1-carboxylate is obtained as crystals melting at 82 to 84° C.

Elementary analysis.—Calculated for $C_{17}H_{21}O_3Cl$ (percent): C, 66.12; H, 6.86; Cl, 11.48. Found (percent): C, 65.89; H, 6.79; Cl, 11.21.

Example 4

In a mixture of 0.5 ml. of 1 N aqueous solution of sodium hydroxide and 10 ml. of water is dissolved 300 mg. of sodium borohydride. The solution is stirred under ice-cooling, followed by dropwise addition of a solution of 4.6 g. of 6-chloro-5-(4'-oxocyclohexyl) indan-1-carboxylic acid in 30 ml. of 1 N aqueous solution of sodium hydroxide. After adding, the mixture is stirred at room temperature for 4 hours so as to complete the reaction. Under ice-cooling, the mixture is acidified with diluted hydrochloric acid, followed by extraction with a mixture of ethyl ether and chloroform. The organic layer is washed with diluted hydrochloric acid and then with a saturated aqueous solution of sodium chloride, and the solvent is evaporated to dryness. The residue is recrystallized from benzene to give 2.9 g. of 6-chloro-5-(4'-trans-hydroxycyclohexyl) indan-1-carboxylic acid as crystals melting at 188 to 190°C.

Elementary analysis.—Calculated for $C_{16}H_{19}O_3Cl$ (percent): C, 65.19; H, 6.50; Cl, 12.03. Found (percent): C, 65.50; H, 6.39; Cl, 12.31.

Example 5

In a mixture of 1.25 ml. of 1 N aqueous solution of sodium hydroxide and 25 ml. of water is dissolved 740 mg. of sodium borohydride. The mixture is stirred under ice-cooling, followed by dropwise addition of a solution of 10 g. of 5-(4'-oxocyclohexyl) indan-1-carboxylic acid in 75 ml. of 1 N aqueous solution of sodium hydroxide. After adding, the mixture is stirred at room temperature for 3.5 hours so as to complete the reaction. After decomposing excess of the sodium borohydride with diluted hydrochloric acid under ice-cooling, the mixture is extracted with a mixture of chloroform and ethyl ether. The organic layer is washed with water and the solvent is evaporated to dryness. The residue is recrystallized from acetone to give 9.1 g. of 5-(4'-trans-hydroxycyclohexyl) indan-1-carboxylic acid as crystals melting at 177 to 179° C.

Elementary analysis.—Calculated for $C_{16}H_{20}O_3$ (percent): C, 73.82; H, 7.74. Found (percent): 73.54; H, 7.69.

Example 6

In 30 ml. of methanol is dissolved 3.44 g. of methyl 5-(4'-oxocyclohexyl) indan-1-carboxylate. While stirring the solution under cooling, 163 mg. of sodium borohydride is added gradually. After adding, the mixture is stirred for 2 hours and 1 ml. of acetic acid is added to the mixture. The mixture is further stirred for a while and, after the addition of water, the mixture is concentrated under reduced pressure. The residue is extracted with ethyl acetate and the organic layer is washed with 5% aqueous solution of sodium bicarbonate and then with an aqueous solution of sodium chloride, and dried over anhydrous sodium sulfate. The solvent is evaporated under reduced pressure.

The residue is passed through a column packed with silica gel and eluted with a mixture of benzene and ethyl acetate (4:1 by volume), whereupon methyl 5-(4'-cis-hydroxycyclohexyl) indan-1-carboxylate is initially eluted to yield 0.8 g. of colorless crystals melting at 63 to 65° C.

Elementary analysis.—Calculated for $C_{17}H_{22}O_3$ (percent): C, 74.42; H, 8.08. Found (percent): C, 74.40; H, 8.30.

Subsequently, methyl 5-(4'-trans-hydroxycyclohexyl) indan-1-carboxylate is eluted to yield 2.1 g. of colorless crystals melting at 107 to 109° C. A portion of the crystals is recrystallized from n-hexane to give crystals melting at 109 to 110° C.

Elementary analysis.—Calculated for $C_{17}H_{22}O_3$ (percent): C, 74.42; H, 8.08. Found (percent): C, 74.47; H, 8.30.

Example 7

One gram of 3-oxo-5-(4'-oxocyclohexyl) indan-1-carboxylic acid is dissolved in 120 ml. of acetic acid and reduced with 300 ml. of hydrogen in the presence of 600 mg. of 5% palladium-charcoal. The reaction mixture is filtered and the filtrate is concentrated under reduced pressure. The residue is dissolved in ethyl acetate. The solution is washed with a saturated aqueous solution of sodium chloride, dried over anhydrous sodium sulfate and distilled to evaporate the solvent. To the residue is added a solution of diazomethane in ethyl ether and the mixture is left standing for 2 hours. The ether is evaporated and the residue is passed through silica gel column and eluted with a mixture of benzene and ethyl acetate (4:1 by volume), whereupon methyl 5-(4'-oxocyclohexyl) indan-1-carboxylate is initially eluted and subsequently methyl 5-(4'-cis-hydroxycyclohexyl) indan-1-carboxylate is eluted. The latter fraction is concentrated to give colorless crystals melting at 63 to 65° C.

Further elution is continued to give a fraction containing methyl 5-(4'-trans-hydroxycyclohexyl) indan-1-carboxylate. After the evaporation of the solvent crystals melting at 107 to 109° C. are obtained. In the present reaction both cis- and trans-isomers are produced in the ratio of about 3:1.

Example 8

To 10 ml. of anhydrous ethanol is added 500 mg. of 5-(4'-oxocyclohexyl) indan-1-carboxylic acid, followed by addition of 0.5 g. of metallic sodium. The mixture is refluxed for 2 hours and poured into 40 ml. of water in its hot state. The mixture is neutralized with hydrochloric acid and extracted with ethyl acetate. The ethyl acetate layer is washed with an aqueous solution of sodium chloride, dried over sodium sulfate and distilled to evaporate the solvent. The residue is treated with a solution of diazomethane in ethyl ether. The resulting products are subjected to column chromatography in a manner similar to that in Example 6, whereby cis- and trans- isomers of methyl 5-(4'-hydroxycyclohexyl) indan-1-carboxylate are given in the ratio of about 3:7.

Example 9

To a mixture of 200 ml. of acetic acid and 20 ml. of concentrated hydrochloric acid are added 5.0 g. of 5-(4'-oxocyclohexyl) indan-1-carboxylic acid and 450 mg. of platinic oxide and the mixture is shaken with hydrogen, till 750 ml. of hydrogen is absorbed. Catalyst is removed by filtration and the solvent is evaporated under reduced pressure. To the residue are added 200 ml. of 50% ethanol and 5 g. of sodium hydroxide and the mixture is refluxed for 4 hours. After evaporation of the ethanol under reduced pressure, the residue is acidified with hydrochloric acid. The resulting precipitates are extracted with chloroform. The chloroform layer is washed, dried and distilled under reduced pressure to evaporate the solvent. The residue is recrystallized from acetone, whereby 3.2 g. of 5-(4'-cis-hydroxycyclohexyl) indan-1-carboxylic acid is obtained as crystals melting at 186 to 188° C.

Elementary analysis.—Calculated for $C_{16}H_{20}O_3$ (percent): C, 73.82; H, 7.74. Found (percent): C, 73.59; H, 7.61.

Example 10

A mixture of 4.3 g. of methyl 6-chloro-5-(4'-oxocyclohexyl) indan-1-carboxylate, 350 mg. of platinic oxide, 160 ml. of acetic acid and 16 ml. of concentrated hydrochloric acid is shaken with hydrogen till 640 ml. of hydrogen is absorbed. The catalyst is removed by filtration and the solvent is evaporated under reduced pressure. To the residue are added 200 ml. of 50% ethanol and 5 g. of sodium hydroxide and the mixture is refluxed for 4 hours. The ethanol is evaporated under reduced pressure and the residue is treated with activated charcoal and acidified with hydrochloric acid. The resulting precipitates are washed with water and recrystallized from acetone, whereby 2.3 g. of 6-chloro-5-(4'-cis-hydroxycyclohexyl) indan-1-carboxylic acid is obtained as crystals melting at 206 to 208° C.

Elementary analysis.—Calculated for $C_{16}H_{19}O_3Cl$ (percent): C, 65.19; H, 6.50; Cl, 12.03. Found (percent): C, 65.37; H, 6.42; Cl, 11.94.

Example 11

To a mixture of 400 ml. of acetic acid and 40 ml. of concentrated hydrochloric acid are added 10 g. of 5-(3'-oxocyclohexyl) indan-1-carboxylic acid and 1 g. of platinic oxide and the mixture is shaken with hydrogen, until 1.1 l. of hydrogen is absorbed. The catalyst is removed by filtration and the solvent is evaporated under reduced pressure. To the residue are added 100 ml. of 50% ethanol and 6 g. of potassium hydroxide and the mixture is refluxed for 4 hours. The ethanol is evaporated under reduced pressure and water is added to the residue. The mixture is washed with ethyl ether and the aqueous layer is acidified with hydrochloric acid, followed by extraction with chloroform. The chloroform extract is dried and distilled under reduced pressure to evaporate the solvent. The residue is treated with diazomethane and the resulting methyl ester is purified by column chromatography on silica gel with a mixture of benzene and ethyl acetate (4:1 by volume), whereupon methyl 5-(3'-trans-hydroxycyclohexyl) indan-1-carboxylate is otained. Melting point: 40 to 55° C.

Nuclear magnetic resonance spectrum (in deutero chloroform $\tau$) of the compound:

6.3 (singlet, protons of methyl ester)
6.01 (triplet, methine proton of 1-position)
5.82 (broad singlet, equatorial H of 3'-potition)

Some portion of the compound is recrystallized from a mixture of ethyl ether and n-hexane to give crystals melting at 60 to 70° C.

Elementary analysis.—Calculated for $C_{17}H_{22}O_3$ (percent): C, 74.42; H, 8.08. Found (percent): C, 74.70; H, 7.91.

There is obtained as by-product methyl 5-(3'-cis-hydroxycyclohexyl) indan-1-carboxylate. Melting point: 50 to 56° C.

Nuclear magnetic resonance spectrum (in deutero chloroform, $\tau$) of the compound:

6.29 (singlet, protons of methyl ester)
6.28 (broad multiplet, axial H of 3'-position)
5.99 (triplet, methine proton of 1-position)

Some portion of the compound is recrystallized from a mixture of ethyl ether and n-hexane to give crystals melting at 60 to 62° C.

Elementary analysis.—Calculated for $C_{17}H_{22}O_3$ (percent): C, 74.42; H, 8.08. Found (percent): C, 74.40; H, 8.15.

Example 12

To a mixture of 1.5 g. of sodium hydroxide and 36 ml. of water is added 5.9 g. of 5-(3'-oxocyclohexyl) indan-1-carboxylic acid, whereby a solution of sodium salt of the carboxylic acid is formed. The solution is added dropwise to a mixture of 370 mg. of sodium borohydride, 70 mg. of sodium hydroxide and 13 ml. of water with stirring under cooling with ice-water. Four hours after the addition, the mixture is acidified with hydrochloric acid and extracted with chloroform. The chloroform extract is dried and distilled under reduced pressure to evaporate the solvent, whereby 5.3 g. of 5-(3'-cis-hydroxycyclohexyl) indan-1-carboxylic acid is obtained as crude crystals.

The compound is treated with diazomethane and the resulting methyl ester is purified by column chromatography on silica gel with a mixture of benzene and ethyl acetate (4:1 by volume), whereby methyl 5-(3'-cis-hydroxycyclohexyl) indan-1-carboxylate is obtained as main product and methyl 5-(3'-trans-hydroxycyclohexyl) indan-1-carboxylate is obtained as by-product.

Those main and by-products show the same infrared and nuclear magnetic resonance spectra as those of the compounds obtained in Example 11.

In a similar procedure to the above, $\alpha$-form of 5-(3'-oxocyclohexyl) indan-1-carboxylic acid is reduced and the reduction product is recrystallized from ethyl acetate, whereby $\alpha$-form of 5-(3'-cis-hydroxycyclohexyl) indan-1-carboxylic acid is obtained as colorless crystals melting at 163 to 166° C.

Elementary analysis.—Calculated for $C_{16}H_{20}O_3$ (percent): C, 73.82; H, 7.74. Found (percent): C, 73.57; H, 7.71.

In a similar procedure to the above, $\beta$-form of 5-(3'-oxocyclohexyl) indan-1-carboxylic acid gives $\beta$-form of 5-(3'-cis-hydroxycyclohexyl) indan-1-carboxylic acid as colorless crystals melting at 155 to 158° C.

Elementary analysis.—Calculated for $C_{16}H_{20}O_3$ (percent): C, 73.82; H, 7.74. Found (percent): C, 73.59; H, 7.76.

EXAMPLES OF HALOGENATION

Example 13

A solution of 2.93 g. of 5-(4'-oxocyclohexyl) indan-1-carboxylic acid in 170 ml. of methylene chloride is added dropwisely and with stirring to a mixture of 7.57 g. of powdered aluminum chloride and 170 ml. of methylene chloride under cooling with ice-water. The mixture is stirred for further 20 minutes and cooled at −30° C. with Dry Ice-acetone bath, followed by addition of 26.6 g. of 3.33% (by weight) solution of chlorine in methylene chloride.

After adding, the mixture is stirred at −25° C. for 5 hours and poured into a mixture of ice and hydrochloric acid. The mixture is extracted with chloroform and the chloroform layer is washed with an aqueous solution of sodium chloride and dried over anhydrous sodium sulfate. The solvent is evaporated to dryness under reduced pressure. The residue is dissolved in ethyl ether and treated with diazomethane.

The resulting product is purified by columnchromatography on silica gel with chloroform-acetone (100:1.5), whereupon 1.10 g. of methyl 6-chloro-5-(4'-oxocyclohexyl) indan-1-carboxylate is obtained as an oily substance.

Example 14

To 480 ml. of acetonitrile is added 7.8 g. of 5-(4'-trans-hydroxycyclohexyl) indan-1-carboxylic acid. The mixture is stirred under ice-cooling, followed by addition of 58 g. of acetonitrile containing 3.75 g. of chlorine. After adding, the mixture is stirred at 5 to 10° C. for 6 hours so as to complete the reaction. Excess of the chlorine and the solvent are evaporated at about 20° C. under reduced pressure. The residue is recrystallized from benzene to yield 6.2 g. of 6-chloro-5-(4'-trans-hydroxycyclohexyl) indan-1-carboxylic acid as crystals melting at 188 and 190° C.

Elemnetary analysis.—Calculated for $C_{16}H_{19}O_3Cl$ (percent): C, 65.19; H, 6.50; Cl, 12.03. Found (percent): C, 64.91; H, 6.61; Cl, 11.89.

Example 15

To 100 ml. of acetonitrile is added 1.5 g. of methyl 5-(4'-trans-hydroxycyclohexyl) indan - 1 - carboxylate. While stirring the mixture under ice-cooling, 4.7 g. of acetonitrile containing 10% by weight of chlorine is dropwisely added. After adding, the stirring is continued for 5 hours under ice-cooling and then nitrogen gas is introduced into the mixture to remove the resulting hydrogen chloride. To the resulting mixture is added dropwisely additional 4.7 g. of acetonitrile containing 10% by weight of chlorine. The mixture is stirred for 5 hours and distilled to evaporate the solvent. The residue is purified by column-chromatography on silica gel with benzene-ethyl acetate (7:1), whereupon 430 mg. of methyl 6-chloro-5-(4'-trans-hydroxycyclohexyl) indan-1-carboxylate is obtained as colorless crystals melting at 82 to 84° C.

Elementary analysis.—Calculated for $C_{17}H_{21}O_3Cl$ (percent): C, 66.13; H, 6.86; Cl, 11.48. Found (percent): C, 65.84; H, 6.77; Cl, 11.71.

Example 16

5.6 g. of 5-(4'-cis-hydroxycyclohexyl) indan-1-carboxylic acid is dissolved in 600 ml. of acetonitrile under heating. To the solution is added with stirring and under cooling with ice 36 g. of a solution of 2.8 g. of chlorine in acetonitrile. The mixture is stirred under cooling with ice for 5 minutes and at room temperature for 2 hours. Excess of the chlorine and acetonitrile is evaporated under reduced pressure below 20° C. The residue is crystallized from acetone, whereby 1.9 g. of 6-chloro-5-(4'-cis-hydroxycyclohexyl) indan-1-carboxylic acid is obtained as crystals melting at 206 to 208° C.

Elementary analysis.—Calculated for $C_{16}H_{19}O_3Cl$ (percent): C, 65.19; H, 6.50; Cl, 12.03. Found (percent): C, 65.28; H, 6.44; Cl, 12.07.

Example 17

In 400 ml. of acetonitrile is dissolved 5.8 g. of methyl 5-(4'-cis-hydroxycyclohexyl) indan-1-carboxylate and the solution is stirred under cooling with ice, followed by addition of 34 g. of acetonitrile solution containing 2.6 g. of chlorine. The mixture is stirred for 5 minutes under cooling with ice and for 1 hour at room temperature. Excess of the chlorine and the solvent are evaporated below 20° C. under reduced pressure. The residue is purified by column chromatography on 500 g. of silica gel with a mixture of benzene and ethyl acetate (4:1 by volume), whereby 2.3 g. of methyl 6-chloro-5-(4'-cis-hydroxycyclohexyl) indan-1-carboxylate is obtained as oil.

Infrared spectrum of the oil: (neat, cm.$^{-1}$) 3400, 1730.

Nuclear magnetic resonance spectrum of the oil (deutero chloroform, τ)

6.3 (singlet, H of methyl ester)
2.7 (singlet, aromatic H of the 7-position)
2.84 (singlet, aromatic H of the 4-position)
6.04 (triplet, methine proton of the 1-position)
5.88 (broad singlet, equatorial H of the 4'-position)

Elementary analysis.—Calculated for $C_{17}H_{21}O_3Cl$ (percent): C, 66.13; H, 6.86; Cl, 11.48. Found (percent): C, 65.87; H, 6.81; Cl, 11.21.

Example 18

In 400 ml. of acetonitrile is dissolved 6.2 g. of methyl 5 - (4' - ethylenedioxycyclohexyl) indan-1-carboxylate and the solution is stirred under cooling with ice. 35 g. of acetonitrile solution containing 2.7 g. of chlorine is added and the mixture is stirred for 5 minutes under cooling with ice and for further 1 hour at room temperature. Excess of the chlorine and the acetonitrile are evaporated under reduced pressure. To the residue are added 50 ml. of water, 50 ml. of ethanol and 5 ml. of acetic acid and the mixture is refluxed for 4 hours. After evaporation of the ethanol under reduced pressure, the residue is extracted with chloroform. The chloroform layer is washed with water, dried and distilled under reduced pressure to evaporate the solvent. The residue is purified by column chromatography on 500 g. of silica gel with a mixture of benzene and ethyl acetate (4:1 by volume), whereby 2.1 g. of methyl 6-chloro-5-(4'-oxocyclohexyl) indan-1-carboxylate is obtained as oil, which is identical with the compound obtained in Example 14 in infrared and nuclear magnetic resonance spectra.

Elementary analysis.—Calculated for $C_{17}H_{19}O_3Cl$ (percent): C, 66.55; H, 6.24; Cl, 11.56. Found (percent): C, 66.31; H, 6.27; Cl, 11.41.

Example 19

In 300 ml. of acetonitrile is dissolved under heating 3.0 g. of crude crystals of 5-(3'-cis-hydroxycyclohexyl) indan-1-carboxylic acid which is obtained in Example 12. After the temperature of the solution is reduced to room temperature, 11.4 g. of acetonitrile containing 14.7 weight percent of chlorine is added dropwise with stirring. The reaction mixture is stirred at 5–15° C. under cooling with ice-water for 1.5 hours. After evaporation of excess of the chlorine and acetonitrile under reduced prressure, the residue is purified by column chromotography on 300 g. of silica gel containing 1% by weight of oxalic acid with a mixture of benzene and ethyl acetate (4:1 by volume), whereupon diastereoisomers of 6-chloro-5-(3'-cis-hydroxycyclohexyl) indan-1-carboxylic acid are obtained, one melting at 120 to 122° C. and the other at 175 to 177° C. Those are eluted in this order.

The diastereoisomers show the same patterns in nuclear magnetic resonance spectra with one another.

In a similar procedudre to the above, α-form of 5-(3'-cis-hydroxycyclohexyl) indan - 1 - carboxylic acid gives colorless crystals melting at 175 to 177° C., which are identical with the compound of the same melting point obtained above.

Elementary analysis.—Calculated for $C_{16}H_{19}ClO_3$ (percent): C, 65.19; H, 6.50; Cl, 12.03. Found (percent): C, 65.03; H, 6.44; Cl, 12.18.

In a similar procedure to the above, α-form of 5-(3'-cis-hydroxycyclohexyl) indan - 1 - carboxylic acid gives colorless crystals melting at 120 to 122° C., which are identical with the compound of the same melting point obtained above.

Elementary analysis.—Calculated for $C_{16}H_{19}ClO_3$ (percent): C, 65.19; H, 6.50; Cl, 12.03. Found (percent): C, 64.97; H, 6.66; Cl, 12.01.

Example 20

In 50 ml. of acetonitrile is dissolved 1 g. of methyl 5-(3'-cis-hydroxycyclohexyl) indan-1-carboxylate. To the solution is added under cooling with ice water 6.62 g. of acetonitrile containing 0.52 g. of chlorine and the mixture is stirred for 5 minutes under coolinng with ice and for further 1 hour at room temperature. Excess of the chlorine and the solvent are evaporated under reduced pressure and the residue is purified by column chromatography on silica gel with chloroform, whereupon 480 mg. of methyl 6-chloro-5-(3' - cis - hydroxycyclohexyl) indan-1-carboxylate is obtained as oil.

Nuclear magnetic resonance spectrum (in deutero chloroform, $\tau$) of the oil.

6.3 (singlet, protons of methyl ester)
6.04 (triplet, methine proton of 1-position)
6.3 (broad multiplet, axial H of 3'-position)
2.91 (singlet, aromatic H of 4-position)
2.7 (singlet, aromatic H of 7-position)

Elementary analysis.—Calculated for $C_{17}H_{21}ClO_3$ (percent): C, 66.13; H, 6.86; Cl, 11.48. Found (percent): C, 66.24; H, 6.80; Cl, 11.50.

Example 21

In 100 ml. of acetonitrile is dissolved 2 g. of methyl 5 - (3' - trans - hydroxycyclohexyl) indan-1-carboxylate. To the solution is added under cooling with ice-water 13.24 g. of acetonitrile containing 1.03 g. of chlorine. The mixture is stirred for 5 minutes under cooling with ice and for further 1 hour at room temperature. Excess of the chlorine and the solvent are evaporated under reduced pressure and the residue is purified by column chromatography on silica gel with chloroform, whereupon 1 g. of methyl 6-chloro-5-(3'-trans-hydroxycyclohexyl) indan - 1 - carboxylate is obtained as oil.

Nuclear magnetic resonance spectrum (in deutero chloroform, $\tau$) of the oil.

6.31 (singlet, protons of methyl ester)
6.06 (triplet, methine proton of 1-position)
5.79 (broad singlet, equatorial H of the 3'-position)
2.94 (singlet, aromatic H of 4-position)
2.72 (singlet, aromatic H of 7-position)

Elementary analysis.—Calculated for $C_{17}H_{21}ClO_3$ (percent): C, 66.13; H, 6.86; Cl, 11.48. Found (percent): C, 66.01; H, 6.98; Cl, 11.37.

OTHER EXAMPLES

Example 22

In 100 ml. of acetone is dissolved 1.0 g. of 6-chloro-5-(4'-trans-hydroxycyclohexyl) indan-1-carboxylic acid. To the solution is added in 10 minutes with stirring and under cooling with ice-water 2 ml. of a solution prepared by dissolving 26.37 parts by weight of chromium trioxide in a mixture of 23 parts by weight of chromium trioxide in a mixture of 23 parts by volume of concentrated sulfuric acid and 77 parts by volume of water. The mixture is stirred at 10–20° C. for half an hour and 80 ml. of water is added. The acetone is evaporated under reduced pressure and the precipitated white crystals are collected and dissolved in ethyl acetate. The ethyl acetate solution is washed with diluted hydrochloric acid, dried over anhydrous sodium sulfate and distilled to evaporate the solvent. The residue is recrystallized from ethyl acetate, whereby 0.73 g. of 6-chloro - 5 - (4'-oxocyclohexyl) indan-1-carboxylic acid is obtained as white crystals melting at 159.5° C.

Elementary analysis.—Calculated for $C_{16}H_{17}O_3Cl$ (percent): C, 65.64; H, 5.85; Cl, 12.11. Found (percent): C, 65.50; H, 5.74; Cl, 12.32.

Semicarbazone of the compound melts at 208 to 209° C. (decomposition).

Elementary analysis.—Calculated for $C_{17}H_{20}N_3O_3Cl$ (percent): C, 58.37; H, 5.76; N, 12.02; Cl, 10.13. Found (percent): C, 58.13; H, 5.95; N, 11.74; Cl, 9.68.

Example 23

To 100 ml. of ethyl ether is added 7.5 g. of 6-chloro-5-(4'-trans-hydroxycyclohexyl) indan-1-carboxylic acid. A solution of diazomethane in ethyl ether is added to the mixture with stirring, until color of diazomethane does not disappear. After evaporating excess of the diazomethane and the solvent, the residue is purified by column chromatography on silica gel with benzene-ethyl acetate (7:1), whereupon 6.0 g. of methyl 6-chloro-5-(4'-trans-hydroxycyclohexyl) indan-1-carboxylate is yielded as crystals melting at 82 to 84° C.

Elementary analysis.—Calculated for $C_{17}H_{21}O_3Cl$ (percent): C, 66.12; H, 6.86; Cl, 11.48. Found (percent): C, 66.41; H, 6.79; Cl, 11.61.

Example 24

To 40 ml. of ethyl ether is added 2.0 g. of 5-(4'-oxocyclohexyl) indan-1-carboxylic acid. While stirring occasionally the mixture under cooling, a solution of diazomethane in ethyl ether is dropwise added, until color of diazomethane does not disappear. After adding, the mixture is left standing for 2 hours and the ether is evaporated. The residue is dissolved in ethyl acetate and washed with 5% aqueous solution of sodium bicarbonate and then with a saturated aqueous solution of sodium chloride and dried over anhydrous sodium sulfate. The solvent is evaporated under reduced pressure to yield methyl 5-(4'-oxocyclohexyl) indan-1-carboxylate as oily substance.

Elementary analysis.—Calculated for $C_{17}H_{20}O_3$ (percent): C, 74.97; H, 7.40. Found (percent): C, 74.85; H, 7.26.

Example 25

A mixture of 74 mg. of methyl 5-(4'-trans-hydroxycyclohexyl) indan-1-carboxylate, 250 mg. of sodium hydroxide, 5 ml. of ethanol and 5 ml. of water is refluxed for 5 hours. Water is added to the reaction mixture, followed by concentration. The concentrate is acidified with diluted hydrochloric acid and extracted with ethyl acetate. The ethyl acetate layer is washed with an aqueous solution of sodium chloride, dried over anhydrous sodium sulfate and distilled to evaporate the solvent.

The product is recrystallized from 5 ml. of acetone to yield 150 mg. of 5-(4'-trans-hydroxycyclohexyl) indan-1-carboxylic acid as colorless crystals melting at 177 to 179° C.

Elementary analysis.—Calculated for $C_{16}H_{20}O_3$ (percent): C, 73.82; H, 7.74. Found (percent): C, 73.87; H, 7.64.

Example 26

To 50 ml. of anhydrous ethyl ether is added 3.0 g. of 5-(4'-cis-hydroxycyclohexyl) indan-1-carboxylic acid and a solution of diazomethane in ethyl ether is added to the mixture, till color of diazomethane does not disappear. The ether is evaporated under reduced pressure and the residue is purified by column chromatography on 300 g. of silica gel with a mixture of benzene and ethyl acetate (4:1 by volume), whereby 2.8 g. of methyl 5-(4'-cis-hydroxycyclohexyl) indan-1-carboxylate is obtained as crystals melting at 63 to 65° C.

Elementary analysis.—Calculated for $C_{17}H_{22}O_3$ (percent): C, 74.42; H, 8.08. Found (percent): C, 74.17; H, 8.01.

Example 27

A mixture of 70 mg. of methyl 5-(4'-cis-hydroxycyclohexyl) indan-1-carboxylate, 70 mg. of sodium hydroxide, 2 ml. of water and 2 ml. of ethanol is refluxed for 4 hours. After cooling, water is added to the mixture and the mixture is concentrated under reduced pressure. The concentrate is acidified with hydrochloric acid and extracted with ethyl acetate. The ethyl acetate layer is washed with an aqueous solution of sodium chloride, dried over anhydrous sodium sulfate and distilled to evaporate the solvent. The product is recrystallized from 5 ml. of ethyl acetate to yield 5-(4'-cis-hydroxycyclohexyl) indan-1-carboxylic acid as colorless crystals melting at 186 to 188° C.

Elementary analysis.—Calculated for $C_{16}H_{20}O_3$ (percent): C, 73.82; H, 7.74. Found (percent): C, 73.94; H, 7.66.

Example 28

A mixture of 4.0 g. of methyl 5-(4'-oxocyclohexyl) indan-1-carboxylate, 40 mg. of p-toluenesulfonic acid, 1.6 g. of ethylene glycol and 150 ml. of toluene is refluxed for 4 hours, removing water azeotropically. After cooling, ethyl ether is added and the mixture is washed with water and dried. The solvent is evaporated under reduced pressure and the residue is purified by column chromatography on 100 g. of silica gel with chloroform, whereby 3.8 g. of methyl 5-(4'-ethylenedioxycyclohexyl) indan-1-carboxylate is obtained as crystals melting at 56.5 to 57.5° C.

Elementary analysis.—Calculated for $C_{19}H_{24}O_4$ (percent): C, 72.12; H, 7.65. Found (percent): C, 72.10; H, 7.47.

Example 29

In 240 ml. of 50% ethanol are dissolved 3.3 g. of methyl 6-chloro-5-(4'-cis-hydroxycyclohexyl) indan-1-carboxylate and 6 g. of sodium hydroxide and the solution is refluxed for 4 hours. After cooling, the ethanol is evaporated under reduced pressure. The residue is decolorized with activated charcoal and acidified with hydrochloric acid. The resulting precipitates are collected by filtration, washed with water and recrystallized from acetone, whereby 1.98 g. of 6-chloro-5-(4'-cis-hydroxycyclohexyl) indan-1-carboxylic acid is obtained as crystals melting at 206 to 208° C.

Elementary analysis.—Calculated for $C_{16}H_{19}O_3Cl$ (percent): C, 65.19; H, 6.50; Cl, 12.03. Found (percent): C, 65.41; H, 6.42; Cl, 11.87.

Example 30

To a solution of 1.4 g. of powdery 5-(3'-oxocyclohexyl) indan-1-carboxylic acid in 14 ml. of chloroform is added etherial solution of diazomethane until the solution appears yellowish. After the addition, the mixture is left standing for 1 hour. The solvent is evaporated under reduced pressure and the residue is purified by column chromatography on 200 g. of silica gel with a mixture of benzene and ethylacetate (20:1 by volume). The fraction containing the objective compound is distilled under reduced pressure to evaporate the solvent, whereby 1.4 g. of methyl 5-(3'-oxocyclohexyl) indan-1-carboxylate is obtained as oil.

Infrared spectrum of the compound (neat):

1730 cm.$^{-1}$ (COOCH$_3$)
1710 cm.$^{-1}$ (ketone)

Nuclear magnetic resonance spectrum (in carbon tetrachloride) ($\tau$):

2.94 (quartet, 2H, aromatic protons of 6- and 7-positions)
3.02 (singlet, 1H, aromatic H of 4-position)
6.10 (triplet, 1H, methine proton of 1-position)
6.40 (singlet, 3H, protons of methyl ester)
6.6–8.6 (multiplet, 13H)

Some parts of the oil obtained above, when left standing, gives a crystalline solid. The solid is recrystallized from ethyl ether to give colorless crystals melting at 96 to 98° C. Nuclear magnetic resonance spectrum of the crystals is identical with that described above.

Elementary analysis.—Calculated for $C_{17}H_{20}O_3$ (percent): C, 74.97; H, 7.40. Found (percent): C, 75.07; H, 7.48.

In the similar manner to the above, α-form of 5-(3'-oxocyclohexyl) indan-1-carboxylic acid gives the corresponding methyl ester as colorless crystals melting at 96 to 98° C. The crystals are identical with those obtained above of the same melting point.

In a similar manner to the above, β-form of 5-(3'-oxocyclohexyl) indan-1-carboxylic acid gives the corresponding methyl ester as colorless oil.

Nuclear magnetic resonance spectrum of the oil is identical with that of the α-form ester.

Example 31

To 10 ml. of 50% ethanol are added 400 mg. of methyl 6-chloro-5-(3'-cis-hydroxycyclohexyl) indan-1-carboxylate and 217 mg. of sodium hydroxide and the mixture is refluxed for 1 hour. After cooling, the ethanol is evaporated under reduced pressure. Water is added and the mixture is washed with ethyl ether. The aqueous layer is acidified with hydrochloric acid and extracted with ethyl acetate. The ethyl acetate layer is dried and distilled under reduced pressure to evaporate the solvent, whereby 6-chloro-5-(3'-cis-hydroxycyclohexyl) indan-1-carboxylic acid is obtained. The compound is separated by column chromatography on silica gel containing 1% by weight of oxalic acid with a mixture of benzene and ethyl acetate (4:1 by volume) into two diasteroisomers, α-form melting at 175 to 177° C. and β-form melting at 120 to 122° C. Those diastereoisomers are identical with those obtained in Example 19.

Elementary analysis.—Calculated for $C_{16}H_{19}ClO_3$ (α-form) (percent): C, 65.19; H, 6.50; Cl, 12.03. Found (percent): C, 64.92; H, 6.58; Cl, 12.30.

Elementary analysis.—Calculated for $C_{16}H_{19}ClO_3$ (β-form) (percent): C, 65.19; H, 6.50; Cl, 12.03. Found (percent): C, 65.43; H, 6.37; Cl, 11.95.

Example 32

A solution of 0.5 g. of methyl 6-chloro-5-(trans-4'-hydroxycyclohexyl) indan-1-carboxylate in 10 ml. of methanol is put in a pressure Bombe and 30 ml. of saturated ammonia methanol solution is added. The mixture is heated at 90 to 100° C. on water bath for 5 hours. After evaporating the solvent under reduced pressure, the residue is recrystallized from methanol to give 0.25 g. of 6-chloro-5-(trans-4'-hydroxycyclohexyl) indan-1-carboxamide melting at 193 to 195° C.

Elementary analysis.—Calculated for $C_{16}H_{20}NClO_2$ (percent): C, 65.41; H, 6.86; N, 4.77. Found (percent): C, 65.69; H, 6.74; N, 4.50.

Example 33

Under the atmosphere of nitrogen 0.3 g. of 6-chloro-5-(trans-4'-hydroxycyclohexyl) indan-1-carboxylic acid is added to a solution of 75 mg. of sodium methylate in methanol. The reaction mixture is left standing at room temperature for 6 hours. The solvent is evaporated under reduced pressure and the residue is washed with acetone, whereby 0.28 g. of sodium 6-chloro-5-(trans-4'-hydroxycyclohexyl) indan-1-carboxylate is obtained. The obtained product does not melt or is not decomposed even at 350° C. and shows an infrared absorption spectrum at 1572 cm.$^{-1}$ and 1440 cm.$^{-1}$ significant to the salt.

Elementary analysis.—Calculated for $C_{16}H_{18}ClO_2Na \cdot H_2O$ (percent): C, 57.40; H, 6.02. Found (percent): C, 57.11; H, 6.24.

compound is 6-chloro-5-(3'-hydroxycyclohexyl) indan-1-carboxylic acid.

8. A compound as claimed in the claim 1, wherein the compound is methyl 6-chloro-5-(3'-hydroxycyclohexyl) indan-1-carboxylate.

Chart 1

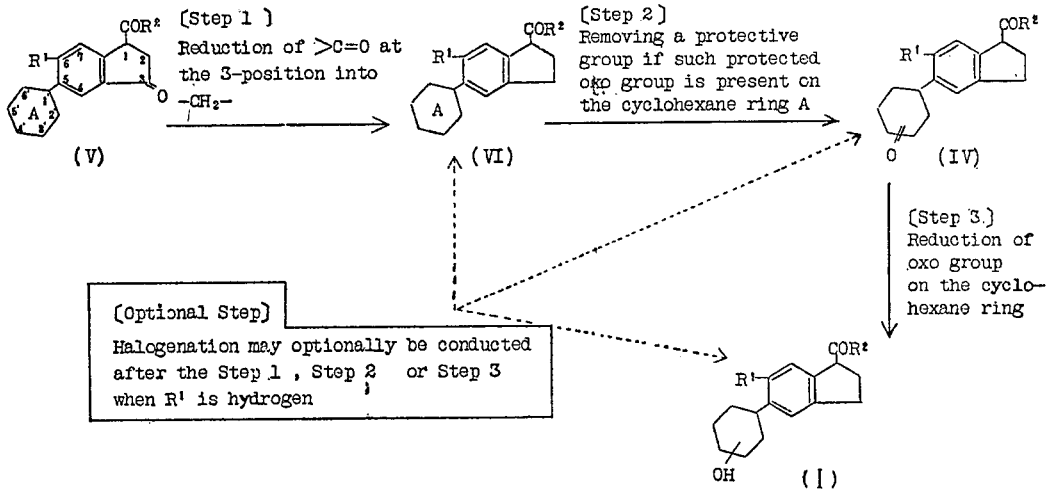

What we claim is:

1. A compound of the formula

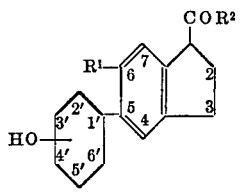

wherein $R^1$ is hydrogen or halogen and $R^2$ is hydroxy, lower alkoxy or OMe, wherein Me is a metal which forms a pharmaceutically acceptable salt.

2. A compound as claimed in the claim 1, wherein the hydroxy group is attached to the 4'-portion.

3. A compound as claimed in the claim 1, wherein the hydroxy group is attached to the 3'-position.

4. A compound as claimed in the claim 1, wherein the compound is 6-chloro-5-(4'-hydroxycyclohexyl) indan-1-carboxylic acid.

5. A compound as claimed in the claim 1, wherein the compound is methyl 6-chloro-5(4'-hydroxycyclohexyl) indan-1-carboxylate.

6. A compound as claimed in the claim 1, wherein the compound is sodium 6-chloro-5(4'-hydroxycyclohexyl) indan-1-carboxylate.

7. A compound as claimed in the claim 1, wherein the

9. A compound as claimed in the claim 1, wherein the compound is 5-(4'-hydroxycyclohexyl) indan-1-carboxylic acid.

10. A compound as claimed in the claim 1, wherein the compound is methyl 5-(4'-hydroxycyclohexyl) indan-1-carboxylate.

11. A compound as claimed in the claim 1, wherein the compound is 5-(3'-hydroxycyclohexyl) indan-1-carboxylic acid.

12. A compound as claimed in the claim 1, wherein the compound is methyl 5-(3'-hydroxycyclohexyl) indan-1-carboxylate.

References Cited
UNITED STATES PATENTS

| | | | |
|---|---|---|---|
| 3,565,904 | 2/1971 | Juby et al. | 260—473 FX |
| 3,565,943 | 2/1971 | Juby et al. | 260—473 FX |
| 3,663,627 | 5/1972 | Juby et al. | 260—520 X |
| 3,696,111 | 10/1972 | Juby et al. | 260—520 X |

LORRAINE A. WEINBERGER, Primary Examiner

J. F. TERAPANE, Assistant Examiner

U.S. Cl. X.R.

260—340.9, 346.8 R, 465 R, 469, 501.1, 501.17, 515 R, 515 A, 515 P, 520, 546, 559 R, 590; 424—308, 317, 324